United States Patent [19]

Anderson et al.

[11] Patent Number: 4,635,727

[45] Date of Patent: Jan. 13, 1987

[54] METHOD OF FRACTURING A SUBTERRANEAN FORMATION

[75] Inventors: James L. Anderson; Javad Paktinat, both of Arlington, Tex.

[73] Assignee: Hughes Tool Company, Houston, Tex.

[21] Appl. No.: 764,819

[22] Filed: Aug. 12, 1985

[51] Int. Cl.$^4$ .............................................. E21B 43/26
[52] U.S. Cl. .................................. 166/308; 166/281; 252/8.551
[58] Field of Search .............................. 166/281, 308; 252/8.55 R

[56] References Cited

U.S. PATENT DOCUMENTS

| | | |
|---|---|---|
| 3,974,077 | 8/1976 | Free . |
| 4,126,181 | 11/1978 | Black . |
| 4,210,206 | 7/1980 | Ely et al. . |
| 4,470,915 | 9/1984 | Conway . |
| 4,477,360 | 10/1984 | Almond . |
| 4,488,975 | 12/1984 | Almond ........................ 166/308 X |
| 4,502,967 | 3/1985 | Conway ........................ 166/308 X |
| 4,514,309 | 4/1985 | Wadhwa ........................ 166/308 X |

Primary Examiner—Stephen J. Novosad
Assistant Examiner—Thomas J. Odar
Attorney, Agent, or Firm—Charles D. Gunter, Jr.

[57] ABSTRACT

A method of fracturing a subterranean formation is shown in which the holding vessel used to hydrate the hydratable polymer is reduced in size or eliminated. The method includes preparing a base gel from a guar gum and adding a crosslinking system to the base gel to form a crosslinked aqueous gel. The preferred crosslinking system includes (1) zirconium lactate and (2) aluminum chlorohydrate. The crosslinking system allows the hydratable polymer to continue to hydrate in the presence of the crosslinker.

2 Claims, 4 Drawing Figures

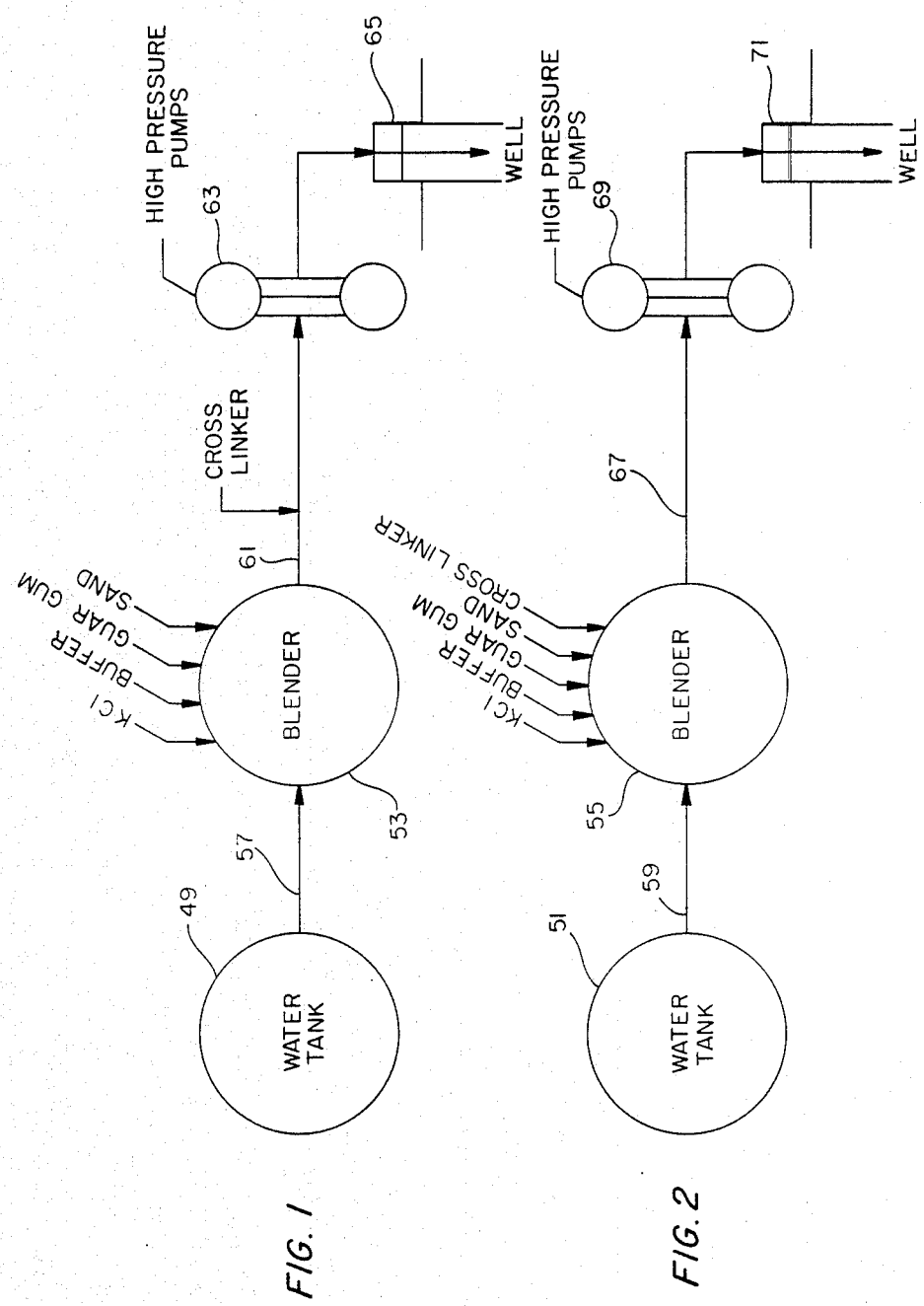

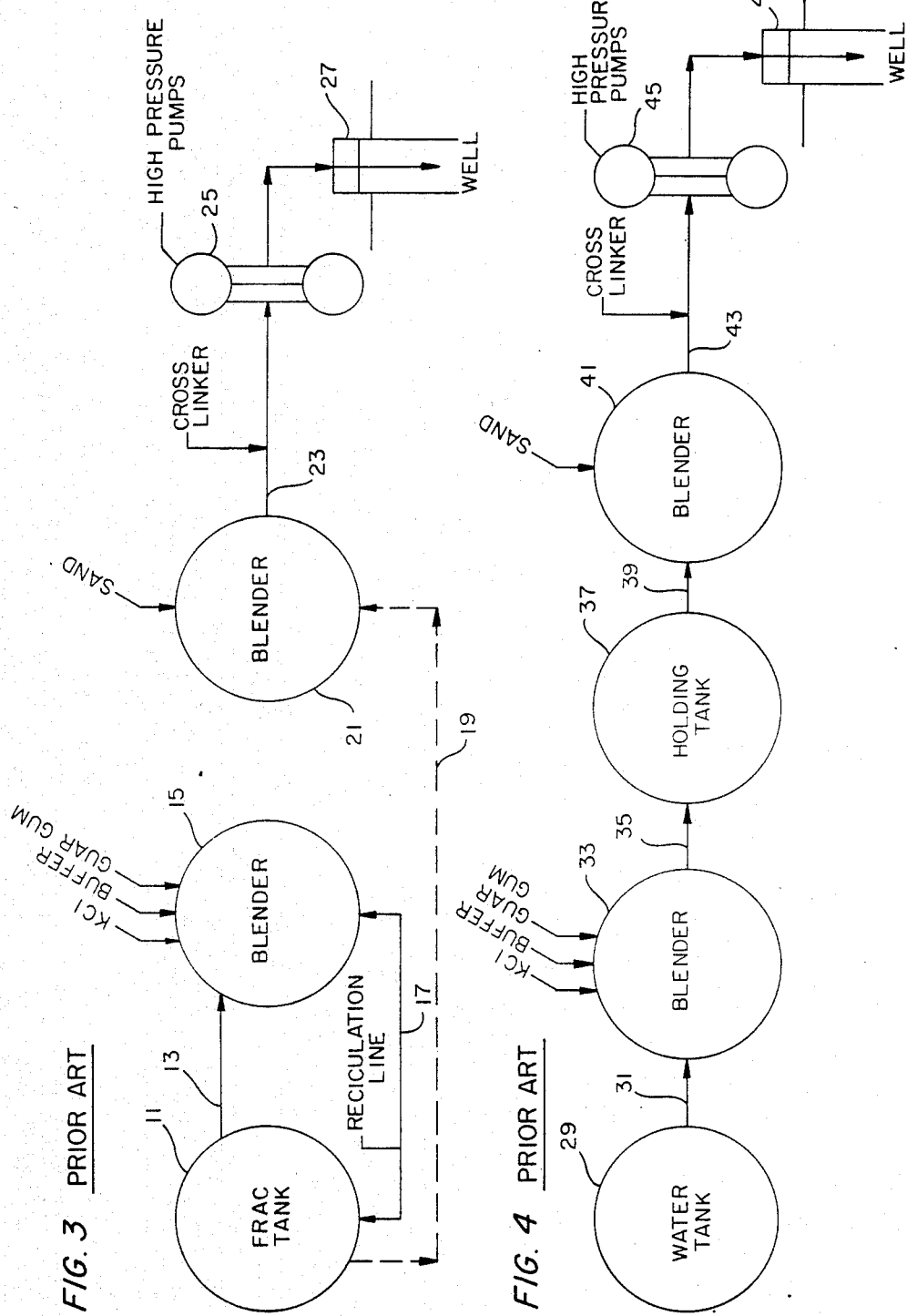

METHOD OF FRACTURING A SUBTERRANEAN FORMATION

BACKGROUND OF THE INVENTION

1. Field of the Invention

This invention relates generally to methods for fracturing subterranean formations penetrated by a well bore utilizing a crosslinked aqueous gel which is injected into the formation through a suitable conduit at a rate and pressure sufficient to fracture the formation.

2. Description of the Prior Art

In fracturing oil and gas wells, a special fluid referred to as a fracturing fluid is pumped down the well to contact the formation to be fractured. The fluid can contain proppant materials such as sand, glass beads, nylon pellets, or the like. The pressure of the fluid composition is increased by pumps located at the surface until the formation is fractured by hydraulic pressure. Fracturing fluid is pumped at a rate sufficient to open a fracture in the exposed formation and extend the fracture from the well bore into the formation. Continued pumping of the fracturing fluid containing a propping agent into the fracture results in proppant placement within the fractured zone. Following the treatment, the fracturing fluid is recovered from the well, leaving the proppant remaining in the fracture, thereby preventing the complete closure of the formation and forming a permeable channel extending from the well bore into the formation.

One fracturing fluid which is in use in fracturing operations includes a guar gum and water. When these two materials are mixed, a viscous gel is formed. The guar gum is usually added to the water in the form of a dry powder which hydrates with time to form a viscous gel. The actual viscosity which is achieved is dependent upon the relative proportions of water and gum used.

While adding increased amounts of gum to the base fluid in one technique for increasing the viscosity of the fluid, such practice quickly becomes uneconomical because of the cost of the gum. A more efficient practice involves the use of crosslinking agents. These agents can be used in very small amounts to give large increases in the apparent viscosity of the base fluid. Some common crosslinking agents include borates, aluminum, and the so called organotitanates.

In the past, it was thought that the gum must be permitted to hydrate for an appreciable length of time in the aqueous fluid prior to the addition of the crosslinking agent. As a result, one typical prior art technique involved the "batch mixing" of the gum and water by supplying water from a frac tank to a blender and adding the gum to the blender. A portion of the product from the agitated blender was drawn off and recirculated to the frac tank until the polymer was fully hydrated. At this point, the aqueous fluid containing the hydrated polymer was drawn off and passed to a blender where proppant was added to the fluid. The fracturing fluid was then flowed toward the wellhead and crosslinker was added to the fluid conduit so that the hydrated polymer was crosslinked on its way to the formation to be fractured. Although this was a workable technique, it is often desirable to provide a continuous fracturing method which can be utilized to introduce an aqueous fluid into the borehole, and in which gelling agent can be hydrated and crosslinked without an appreciable "residence time" in a frac tank or other holding vessel.

The "continuous" prior art techniques which are known to applicants have typically utilized a blender to combine the aqueous fluid and gum. The base gel formed in the blender is passed to an intermediate holding tank which provides a certain "residence time" to allow complete hydration of the polymer. Currently, about a two minute residence time is the minimum required. Lesser residence time is not recommended because the addition of conventional crosslinkers will inhibit the hydration rate of the polymer thus producing an inferior fracturing gel. In other words, when the residence time is too short, full hydration of the polymer is not obtained prior to crosslinking. If conventional crosslinkers are mixed with the partially hydrated polymer, further hydration is not obtained and the viscosity of the resulting fracturing fluid is lower than the optimum value.

The residence time of the polymer in the holding vessel depends upon the capacity of the vessel and the injection rate in a continuous fracturing process. For example, if the capacity of the holding vessel is 25 barrels and the injection rate is 25 barrels per minute, the residence time is one minute. In order to obtain a two minute residence time, it would be necessary to have a holding vessel with a capacity of 50 barrels or a lower injection rate. Although the capacity of the holding vessel is not critical on land, it is desirable to reduce this vessel size on offshore locations.

It is an object of the present invention to provide a continuous mix process for preparing an aqueous fracturing gel in which the size of the holding vessel can be reduced to a minimum, or in which the holding vessel can be eliminated entirely.

Another object of the invention is to provide a continuous fracturing method utilizing a gum and a crosslinker which allows the gum to continue to hydrate in the presence of the crosslinker.

SUMMARY OF THE INVENTION

The method of the invention involves preparing a base gel by mixing together an aqueous fluid, and a hydratable gelling agent selected from the group consisting of glucomannans, galactomannans, and derivatives thereof. A crosslinking means is added to the aqueous fluid, either in the blender vessel or immediately downstream thereof, as fluid is continuously pumped toward the wellhead. The crosslinking means chosen allows continued hydration of the gelling agent in the presence of the crosslinking means and also serves to crosslink the base gel to form a crosslinked aqueous gel after a predicted time period. The crosslinking means comprises (1) a zirconium (IV) chelate or salt, and (2) an aluminum ion donating compound. The resulting crosslinked aqueous gel is introduced into the formation at a flowrate and pressure sufficient to fracture the formation.

Preferably the gelling agent comprises a carboxymethylhydroxypropylguar polymer having a hydroxypropyl molar substitution in the range of 0.25 to 0.45 and a carboxymethyl degree of substitution in the range of 0.1 to 0.4. The preferred crosslinking agent is a liquid solution of zirconium lactate and aluminum chlorohydrate.

Additional objects, features and advantages will be apparent in the written description which follows.

BRIEF DESCRIPTION OF THE DRAWINGS

FIG. 1 is a schematic diagram of one embodiment of the fracturing method of the invention.

FIG. 2 is a schematic diagram similar to FIG. 1 of an alternate embodiment of the fracturing method of the invention.

FIG. 3 is a schematic diagram of a prior art batch fracturing process.

FIG. 4 is a schematic diagram of a prior art continuous fracturing process.

DETAILED DESCRIPTION OF THE INVENTION

FIGS. 3 and 4 illustrate the prior art methods generally employed in preparing crosslinked aqueous gels of the type under consideration. In the "batch" method illustrated in FIG. 3, water is provided to a frac tank 11 from any convenient source. Water is supplied from the frac tank 11 through circuit 13 to a blender vessel 15. The hydratable gum, buffer and potassium chloride ingredients of the fracturing fluid are added to the blender vessel and agitated. As the gum begins to hydrate, fluid is drawn off through a conduit 17 and recirculated to the frac tank 11. After the polymer has fully hydrated, the base gel is drawn off through a conduit 19 (shown in dotted lines in FIG. 3) and passed to a blender vessel 21. A suitable proppant such as sand, is added to the blender vessel 21 and the fracturing fluid containing proppant is withdrawn through a conduit 23. A suitable delayed crosslinker is added as the base gel passes through the conduit and through the high pressure pumps 25 to the wellhead 27. It was necessary to fully hydrate the polymer in the frac tank 11 before addition of the crosslinker in conduit 23, because the polymer would not continue to hydrate in the presence of the crosslinker.

FIG. 4 shows a prior art continuous fracturing method in which water from a suitable source, such as tank 29, is passed through a conduit 31 to a blender vessel 33. The polymer gum, buffer, and potassium chloride are added to the blender vessel, and aqueous fluid passes through conduit 35 to a holding tank 37. After an appropriate "residence time" in the holding tank, the fully hydrated polymer and aqueous fluid are passed through conduit 39 to a blender vessel 41. Proppant can then be added to the base gel in the blender vessel 41. Aqueous gel containing proppant is then withdrawn through conduit 43 and a suitable crosslinker is added on the way to the high pressure pumps 45 and wellhead 47. In order to obtain an appropriate residence time for hydration of the polymer gum, it was necessary to provide a holding tank 37 of substantial capacity. This was especially troublesome in offshore locations where space is at a minimum.

In the method of the invention, a base gel is prepared by mixing together an aqueous fluid, a hydratable gelling agent and a crosslinking means. The aqueous fluid is preferably water, either fresh or sea water, which can be provided from any convenient source. In FIGS. 1 and 2, the water is supplied from a tank 49, 51 which could be located on a fracturing boat or on an offshore platform. If the water is fresh water, a suitable salt, such as potassium chloride, is preferably added at the blender tank as the fresh water is supplied through conduits 57, 59 to provide an approximate 2% potassium chloride solution. Potassium chloride would not be added where the water source was sea water.

A hydratable gelling agent is added to the aqueous fluid in the blender vessel. The hydratable gelling agent is a solvatable polysaccharide having a molecular weight of at least about 100,000. Polysaccharides include the galactomannan gums, glucomannan gums and their derivatives. Solvatable galactomannan and glucomannan gums are naturally occurring. The galactomannan and glucomannan gums can also be reacted with hydrophilic constituents to thereby produce derivatized gelling agents useful in the method of the invention.

Examples of known solvatable polysaccharides include guar gum, locust bean gum, karaya gum, sodium carboxymethylguar, hydroxyethylguar, sodium carboxymethyl hydroxyethylguar, hydroxypropylguar and carboxymethylhydroxypropylguar. The most preferred hydratable gelling agent is a carboxymethylhydroxypropylguar polymer having a hydroxypropyl molar substitution in the range from 0.25 to 0.45 and a carboxymethyl degree of substitution in the range of 0.1 to 0.4, and having a molecular weight of at least about 100,000. The most preferred guar gum useful for the present invention has a hydroxypropyl molar substitution of approximately 0.3 and a carboxymethyl degree of substitution of approximately 0.1.

The gelling agent is used in the aqueous fluid in a concentration in the range from about 0.24 to 1.31% by weight of the aqueous fluid. A concentration of less than about 0.2% by weight of aqueous fluid is not sufficient to provide the necessary viscosity increase in the fracturing fluid while concentrations of polymer above about 1.3% produce an excessive viscosity which is difficult to pump. The most preferred polymer concentration is in the range from about 0.35 to 0.83% by weight of the aqueous fluid. This is equivalent to about 30 to 60 pounds of gelling agent per 1,000 gallons of aqueous fluid.

The novel crosslinking means of the invention allows continued hydration of the gelling agent in the presence of the crosslinking means and also serves to crosslink the base gel to form a crosslinked aqueous gel after a predicted time period. The two-part crosslinking system of the invention includes (1) a zirconium (IV) chelate or salt, and (2) an aluminum ion donating compound. Examples of zirconium (IV) chelates or salts are zirconium carbonate, zirconium acetylacetonate chelate, and zirconium lactate. The preferred crosslinking system is comprised of zirconium lactate and aluminum chlorohydrate. The most preferred crosslinking system is a liquid solution containing approximately 75% by volume of a 7% aqueous solution of active zirconium lactate, and 25% by volume of a 30% aqueous solution of aluminum chlorohydrate.

The crosslinker is either added directly to the blender vessel 55, as shown in FIG. 2, or is added in the conduit 61 immediately after the blender vessel 53, as shown in FIG. 1. The crosslinker is preferably present in a concentration of about 0.75 to 1.50% by weight of the aqueous fluid based upon the total gallons of aqueous fluid being pumped downhole. The aluminum component of the cross linker is preferably present in the range from about 0.0325 to 0.1125% by weight, and the zirconium component is preferably present in the range from about 0.01313 to 0.0938% by weight of the aqueous fluid. The volumetric ratio of 30% aqueous solution of aluminum chlorohydrate to 7% aqueous solution of active zirconium lactate is most preferably about 1:3. The crosslinking means of the invention is preferably added to the aqueous fluid in the range from about 0.75 to 1.50 gallons of crosslinking system per 1,000 gallons of aqueous fluid.

As discussed, a buffer can be added to the aqueous fluid to adjust the pH of the fluid, to render the fluid compatible with the crosslinking agent used to crosslink the gelling agent. The pH adjusting material can be added to the aqueous fluid before, after or during addition of the gelling agent to the aqueous fluid. The particular buffer chosen will depend upon the crosslinking system. The preferred buffer for the crosslinking system of the invention is sodium diacetate. The buffer is generally added in the range from about five pounds to fifteen pounds per 1,000 gallons of aqueous fluid, depending upon the time delay which is desired in crosslinking the base gel. The preferred concentration of buffer is thus in the range from about 0.06 to 0.18% by weight of the aqueous fluid. The addition of buffer within these concentration ranges produces a pH in the system which preferably ranges from between about 4.6 to 5.3.

It should be noted that applicants' novel crosslinking means performs two distinct functions in the method of the invention. First, the crosslinking means delays the rate of the crosslinking reaction for a period of time sufficient to permit pumping of the aqueous gel through the conduit to the subterranean formation. This time can be from several minutes to an hour or more in extremely deep formations. Secondly, the crosslinking means allows the hydratable polymer to continue to hydrate in the presence of the crosslinker so that the crosslinking means and polymer can be added to the aqueous fluid simultaneously, or in any event without first allowing the polymer a given residence time in a holding vessel.

Conventional propping agents can be employed with the fracturing fluid compositions of the invention. Examples of such agents include quartz, sand grains, glass beads, walnut shell fragments, nylon pellets, and the like. Propping agents are typically added in the range from about 1 to 10 pounds per gallon of the aqueous fluid. The proppant is preferably added to the blender vessel 53, 55.

The preferred method for fracturing a subterranean formation penetrated by a wellbore will be described with reference to FIGS. 1 and 2. Water is drawn from a source 49 through a conduit 57 to the blender vessel 53. Potassium chloride, buffer, proppant, and the carboxymethylhydroxypropylguar polymer are mixed at the blender vessel and fluid can be continually drawn off through the conduit 61 and fed toward the high pressure pumps 63. At some point, the crosslinking system of the invention is introduced into the conduit 61 and the hydratable gelling agent continues to hydrate in the presence of the crosslinking system as the fracturing fluid is being pumped by the high pressure pump 63 to the wellhead 65 and downward to the subterranean formation. The action of the crosslinker in forming a crosslinked aqueous fluid is delayed by adjusting the pH of the aqueous fluid through the use of the appropriate buffer.

Alternatively, the process as described can be carried out with the crosslinking system of the invention added directly to the blender vessel 55, as shown in FIG. 2. Because the crosslinking system allows the polymer to continue to hydrate in the presence of the crosslinker, it is not necessary to provide a given residence time in the blender or in a holding tank following the blender. The base gel is continuously drawn off through the conduit 67 and passed through the high pressure pumps 69 to the wellhead 71.

After the aqueous gel has been pumped into the subterranean formation and a fracture has been formed, it is possible to convert the gel into a low viscosity fluid by the use of an appropriate "breaker." Such breakers are commercially available for the system described for use in low temperature reservoirs.

An invention has been provided with several advantages. The crosslinking system of the invention allows continued hydration of the polymer in the presence of the crosslinker. For this reason, the crosslinker can be added directly to the blender vessel into which the polymer, buffer and proppant are added. As a result, the holding tank or blending vessel which are needed in the past to assure adequate residence time for the polymer can be eliminated or greatly reduced in size. That is, if a 50 barrel holding tank would provide a two minute residence time, and a 25 barrel holding tank would provide a one minute residence time, the smaller holding tank is acceptable for use in the present system, since the residence time of the polymer is not critical. For this reason, the system described is especially suited for use in offshore locations, such as offshore platforms or fracturing boats.

While the invention has been shown in only two of its forms, it is not thus limited but is susceptible to various changes and modifications without departing from the spirit thereof.

We claim:

1. A method of fracturing a subterranean formation, comprising the steps of:

preparing a base gel by mixing together an aqueous fluid, a hydratable gelling agent comprising a carboxymethylhydroxypropylguar polymer having a hydroxypropyl molar substitution in the range of 0.1 to 0.4, and having a molecular weight of at least about 100,000, and a sodium discetate buffer capable of adjusting the pH of the base gel;

adding a crosslinking means to the aqueous fluid containing the hydratable gelling agent which allows continued hydration of the gelling agent in the presence of the crosslinking means as the aqueous fluid is being pumped into the well bore and which also serves to crosslink the base gel to form a crosslinked aqueous gel after a predicted time period, the crosslinking means comprising:

a liquid solution containing approximately 75% by volume of a 7% aqueous solution of active zirconium lactate, and 25% by volume of a 30% aqueous solution of aluminum chlorohydrate; and introducing the resulting crosslinked aqueous gel into the formation at a flow rate and pressure sufficient to fracture the formation.

2. A method of reducing the size of holding tanks needed in the fracturing a subterranean formation in offshore locations by reducing the residence time required to hydrate the hydratable polymer used, comprising the steps of:

preparing a base gel by mixing together an aqueous fluid, a hydratable gelling agent comprising a carboxymethylhydroxypropylguar polymer having a hydroxypropyl molar substitution in the range of 0.25 to 0.45 and a carboxymethyl degree of substitution in the range of 0.1 to 0.4, and having a molecular weight of at least about 100,000, and sodium diacetate buffer, the polymer being present in the range from about 0.24 to 1.31% by weight of the gelled aqueous fluid and the buffer being present in the range from about 0.06 to 0.18% by weight of the gelled aqueous fluid;

adding a crosslinking means to the aqueous fluid containing the hydratable gelling agent which allows continued hydration of the gelling agent in the presence of the crosslinking means during pumping of the base gel into the well bore and which also serves to crosslink the base gel to form a crosslinked aqueous gel after a predicted time period, the crosslinking means comprising:

a liquid solution containing approximately 75% by volume of a 7% aqueous solution of active zirconium lactate, and 25% by volume of a 30% aqueous solution of aluminum chlorohydrate, the crosslinking means being introduced in the range from about 0.75 gallons to about 1.50 gallons of crosslinker solution per 1000 gallons of aqueous fluid; and introducing the resulting crosslinked aqueous gel from the well bore into the formation at a flow rate and pressure sufficient to fracture the formation.

* * * * *